UNITED STATES PATENT OFFICE.

ABRAHAM VAN WINKLE, OF NEWARK, NEW JERSEY, ASSIGNOR TO THE HANSON & VAN WINKLE CO., OF NEWARK, NEW JERSEY, A CORPORATION.

ELECTROLYTE.

No. 930,815.   Specification of Letters Patent.   Patented Aug. 10, 1909.

Application filed November 20, 1908. Serial No. 463,560.

*To all whom it may concern:*

Be it known that I, ABRAHAM VAN WINKLE, a citizen of the United States, and a resident of Newark, in the county of Essex and State of New Jersey, have invented a new and Improved Electrolyte, of which the following is a full, clear, and exact description.

The invention relates to electrolytes, such as described in the Letters Patent of the United States, No. 901,758, granted to me on October 20, 1908.

The object of the present invention is to provide a new and improved electrolyte, more especially designed for use in galvanizing or coating iron or steel in such a manner that a very heavy and smooth deposit is obtained, and for this purpose use is made of a solution containing fluosilicate of zinc, in combination with salts of aluminum or other salts of zinc, with an addition of a small quantity of gelatin previously dissolved, or other organic substance that tends to improve the character of the deposit.

By the use of a fluorin salt of zinc there is a great tendency of the galvanizing solution to remain clear, to act freely on the anode and to allow of using a solution as strong as 30° Baumé.

Having thus described my invention, I claim as new and desire to secure by Letters Patent:

1. An electrolyte comprising a solution containing a fluorin salt of zinc, and a small quantity of gelatin.

2. A zinc electrolyte containing fluosilicate of zinc, and another salt of zinc.

3. A zinc electrolyte containing fluosilicate of zinc, and a salt of aluminum.

4. A zinc electrolyte containing fluosilicate of zinc, a salt of zinc, and a small quantity of an organic substance.

5. A zinc electrolyte containing fluosilicate of zinc, a salt of aluminum, and a small quantity of gelatin previously dissolved.

6. An electrolyte comprising a solution of fluosilicate of zinc, and a zinc solution.

In testimony whereof I have signed my name to this specification in the presence of two subscribing witnesses.

ABRAHAM VAN WINKLE.

Witnesses:
JOHN J. MOORE, Jr.,
S. A. BECKENS.